(12) United States Patent
Arao et al.

(10) Patent No.: US 11,137,553 B2
(45) Date of Patent: Oct. 5, 2021

(54) OPTICAL FIBER ARRAY

(71) Applicant: SUMITOMO ELECTRIC INDUSTRIES, LTD., Osaka (JP)

(72) Inventors: Yuki Arao, Osaka (JP); Tetsuya Nakanishi, Osaka (JP); Tetsuya Hayashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/020,018

(22) Filed: Sep. 14, 2020

(65) Prior Publication Data

US 2020/0408997 A1  Dec. 31, 2020

Related U.S. Application Data (63) Continuation of application No. PCT/JP2019/013703, filed on Mar. 28, 2019.

(30) Foreign Application Priority Data

Mar. 29, 2018 (JP) .............................. JP2018-064385

(51) Int. Cl.
  *G02B 6/02* (2006.01)
  *G02B 6/36* (2006.01)
  *G02B 6/38* (2006.01)

(52) U.S. Cl.
  CPC ......... *G02B 6/3838* (2013.01); *G02B 6/3652* (2013.01); *G02B 6/3839* (2013.01); *G02B 6/3858* (2013.01); *G02B 6/02395* (2013.01)

(58) Field of Classification Search
  CPC ............ G02B 6/02042; G02B 6/02395; G02B 6/3652; G02B 6/3838; G02B 6/3839; G02B 6/3858
  See application file for complete search history.

(56) References Cited

U.S. PATENT DOCUMENTS 4,639,074 A * 1/1987 Murphy ................... G02B 6/30
  385/49
4,653,852 A * 3/1987 Suzuki ................ G02B 6/4403
  385/114

(Continued)

FOREIGN PATENT DOCUMENTS

JP  S63-502623 A  9/1988
JP  H09-203815 A  8/1997

(Continued)

*Primary Examiner* — Ryan A Lepisto
(74) *Attorney, Agent, or Firm* — Oliff PLC (57) ABSTRACT

An optical fiber array includes: a multicore optical fiber in which the outer peripheral shape of cladding in a cross section has first and second convex surfaces symmetric with respect to a first axis, and first and second surfaces symmetric with respect to a second axis and closer than extensions of the first and second convex surfaces to the second axis; an arrangement component including a groove having a trapezoidal shape having first and second side surfaces mutually facing such that sectional shapes become closer toward a grove bottom, and a bottom surface; and a pressing member. With the first surface in surface contact with the pressing member, the first convex surface or a boundary portion between the first convex surface and the second surface, and the second convex surface or a boundary portion between the second surface and the second convex surface are in contact with the first and second side surfaces, respectively.

7 Claims, 9 Drawing Sheets

(56) References Cited

U.S. PATENT DOCUMENTS

| | | | | |
|---|---|---|---|---|
| 4,932,740 | A * | 6/1990 | Berkey | G02B 6/2835 |
| | | | | 385/126 |
| 6,332,719 | B1 * | 12/2001 | Nishikawa | G02B 6/4224 |
| | | | | 356/401 |
| 6,510,709 | B1 * | 1/2003 | Yamashita | C03B 11/08 |
| | | | | 264/1.21 |
| 6,882,790 | B2 * | 4/2005 | Niiyama | G02B 6/30 |
| | | | | 385/137 |
| 7,371,020 | B2 * | 5/2008 | Kanda | G02B 6/2551 |
| | | | | 385/96 |
| 8,721,192 | B2 * | 5/2014 | Miyadera | G02B 6/30 |
| | | | | 385/91 |
| 9,069,144 | B2 * | 6/2015 | Bradley | G02B 6/3861 |
| 9,322,987 | B2 * | 4/2016 | Doany | G02B 6/02042 |
| 2007/0297712 | A1 * | 12/2007 | Meneghini | G02B 6/02042 |
| | | | | 385/13 |
| 2010/0290750 | A1 | 11/2010 | Imamura | |
| 2011/0229086 | A1 | 9/2011 | Bradley et al. | |
| 2015/0247980 | A1 | 9/2015 | Bradley et al. | |
| 2015/0323736 | A1 | 11/2015 | Ishida et al. | |
| 2016/0070058 | A1 | 3/2016 | Nakanishi et al. | |

FOREIGN PATENT DOCUMENTS

| | | |
|---|---|---|
| JP | 2003-156648 A | 5/2003 |
| JP | 2005-202329 A | 7/2005 |
| JP | 2014-163946 A | 9/2014 |
| JP | 2015-068892 A | 4/2015 |
| JP | 2015-118270 A | 6/2015 |
| WO | 87/005119 A1 | 8/1987 |

* cited by examiner

OPTICAL FIBER ARRAY

CROSS REFERENCES TO RELATED APPLICATIONS

This is a continuation application of PCT/JP2019/013703 claiming the benefit of the Japanese Patent Application No. 2018-064385 filed in the Japan Patent Office on Mar. 29, 2018, the entire contents of which are incorporated herein by reference.

BACKGROUND OF THE INVENTION

1. Field of the Invention

The present disclosure relates to an optical fiber array.

2. Description of the Related Art

A multicore optical fiber includes a plurality of cores covered by common cladding and increases transmission capacity per one optical fiber. A known method for connecting two multicore optical fibers to each other includes, for example, first, disposing the multicore optical fibers in a V-shaped groove (V-groove), aligning (also referred to as rotational alignment) the array of cores with a specific direction, and pressing the multicore optical fibers from above by a pressing plate.

It is difficult to align the array direction of the cores with a specific direction when the shape of the multicore optical fibers is circular in a sectional view. Therefore, for example, U.S. Patent Application Publication No. 2011/0229086 discloses a structure of a multicore optical fiber whose cross section perpendicular to the longitudinal direction has a substantially D-shape with a portion of the outer surface of cladding cut and removed to be a flat surface.

SUMMARY OF THE INVENTION

An optical fiber array according to one aspect of the present disclosure includes:

at least one multicore optical fiber each including a glass fiber and a resin coat covering the glass fiber, the glass fiber including a plurality of cores and cladding surrounding the plurality of cores, the cladding having an outer peripheral shape having a first convex surface, a second convex surface, a first surface, and a second surface, the first convex surface and the second convex surface having shapes that are symmetric with respect to a first axis and that protrude to be spaced apart from the first axis in a cross section orthogonal to a longitudinal direction of each multicore optical fiber, the first surface and the second surface having shapes that are symmetric with respect to a second axis orthogonal to the first axis and that are cut to be closer than an extension of the first convex surface and an extension of the second convex surface to the second axis in the cross section orthogonal to the longitudinal direction of each multicore optical fiber;

an arrangement component on which the glass fiber is disposed, the arrangement component including a groove that houses the glass fiber exposed at one end of each multicore optical fiber from the resin coat, an inner peripheral shape of the groove in a cross section orthogonal to a longitudinal direction of the groove being a trapezoidal shape having a first side surface, a second side surface, and a bottom surface, the first side surface and the second side surface facing each other so as to become closer to each other from an opening toward a groove bottom, the bottom surface facing the opening and being continuous with the first side surface and the second side surface; and a pressing member that presses the glass fiber toward the arrangement component and fixes the glass fiber in the groove. In a state in which the first surface of the cladding is in surface contact with the pressing member, the first convex surface of the cladding is in contact with the first side surface and the second convex surface is in contact with the second side surface, or a boundary portion between the first convex surface and the second surface is in contact with the first side surface and a boundary portion between the second surface and the second convex surface is in contact with the second side surface.

DESCRIPTION OF THE PREFERRED EMBODIMENTS

Contents of an embodiment of the present disclosure will be first listed and described. An optical fiber array according to one aspect of the present disclosure (1) includes: at least one multicore optical fiber including a glass fiber and a resin coat covering the glass fiber, the glass fiber each including a plurality of cores and cladding surrounding the plurality of cores, the cladding having an outer peripheral shape having a first convex surface, a second convex surface, a first surface, and a second surface, the first convex surface and the second convex surface having shapes that are symmetric with respect to a first axis and that protrude to be spaced apart from the first axis in a cross section orthogonal to a longitudinal direction of each multicore optical fiber, the first surface and the second surface having shapes that are symmetric with respect to a second axis orthogonal to the first axis and that are cut to be closer than an extension of the first convex surface and an extension of the second convex surface to the second axis in the cross section orthogonal to the longitudinal direction of each multicore optical fiber; an arrangement component on which the glass fiber is disposed, the arrangement component including a groove that houses the glass fiber exposed at one end of each multicore optical fiber from the resin coat, an inner peripheral shape of the groove in a cross section orthogonal to a longitudinal direction of the groove being a trapezoidal shape having a first side surface, a second side surface, and a bottom surface, the first side surface and the second side surface facing each other so as to become closer to each other from an opening toward a groove bottom, the bottom surface facing the opening and being continuous with the first side surface and the second side surface; and a pressing member that presses the glass fiber toward the arrangement component and fixes the glass fiber in the groove. In a state in which the first surface of the cladding is in surface contact with the pressing member, the first convex surface of the cladding is in contact with the first side surface and the second convex surface is in contact with the second side surface, or a boundary portion between the first convex surface and the second surface is in contact with the first side surface and a boundary portion between the second surface and the second convex surface is in contact with the second side surface.

(2) In one aspect of the optical fiber array according to the present disclosure, the trapezoidal shape is a shape that enables the first convex surface of the cladding to come into contact with the first side surface of the groove, the boundary portion between the first convex surface and the second surface to come into contact with the bottom surface, and the second convex surface to come into contact with the second side surface. Consequently, it is possible to rotate each multicore optical fiber easily in the groove. In this case, (3) an angle ϕ formed by the second axis passing through a center of the cladding and the first side surface or the second side surface may be π/2 or less.

(4) In one aspect of the optical fiber array according to the present disclosure, the trapezoidal shape is a shape that enables the first convex surface of the cladding to come into contact with each of the first side surface and the bottom surface of the groove, and the second surface to come into contact with the second side surface. Consequently, it is possible to rotate the each multicore optical fiber easily in the groove. In this case, (5) an angle θ formed by an extension of the first side surface and an extension of the second side surface with respect to the opening may be π/2 or more.

(6) In one aspect of the optical fiber array according to the present disclosure, the at least one multicore optical fiber comprises multicore optical fibers including glass fibers respectively and the glass fibers are disposed side by side on the arrangement component. Consequently, it is possible to rotate each of the multicore optical fibers disposed side by side easily in the groove.

Hereinafter, an embodiment of the optical fiber array according to the present disclosure will be described with reference to the drawings.

The multicore optical fiber described in U.S. Patent Application Publication No. 2011/0229086 is asymmetric with respect to a plane that includes the center axis and that is parallel to the flat surface. When drawing is performed after a portion of the outer surface of an optical fiber preform is cut and removed to form a flat surface, the optical fiber is caused to easily warp (curl) toward the flat surface. To solve this circumstance, forming the outer peripheral shape of the multicore optical fiber to have two mutually facing flat surfaces is conceivable. There is, however, a problem that it is difficult to align the array direction of the cores with a specific direction since, when the multicore optical fiber having the two mutually facing flat surfaces is disposed in a V-groove, the multicore optical fiber sinks to the bottom of the V-groove. The present disclosure provides an optical fiber array capable of aligning the array direction of a plurality of cores easily with a desired direction.

Figure 1A:
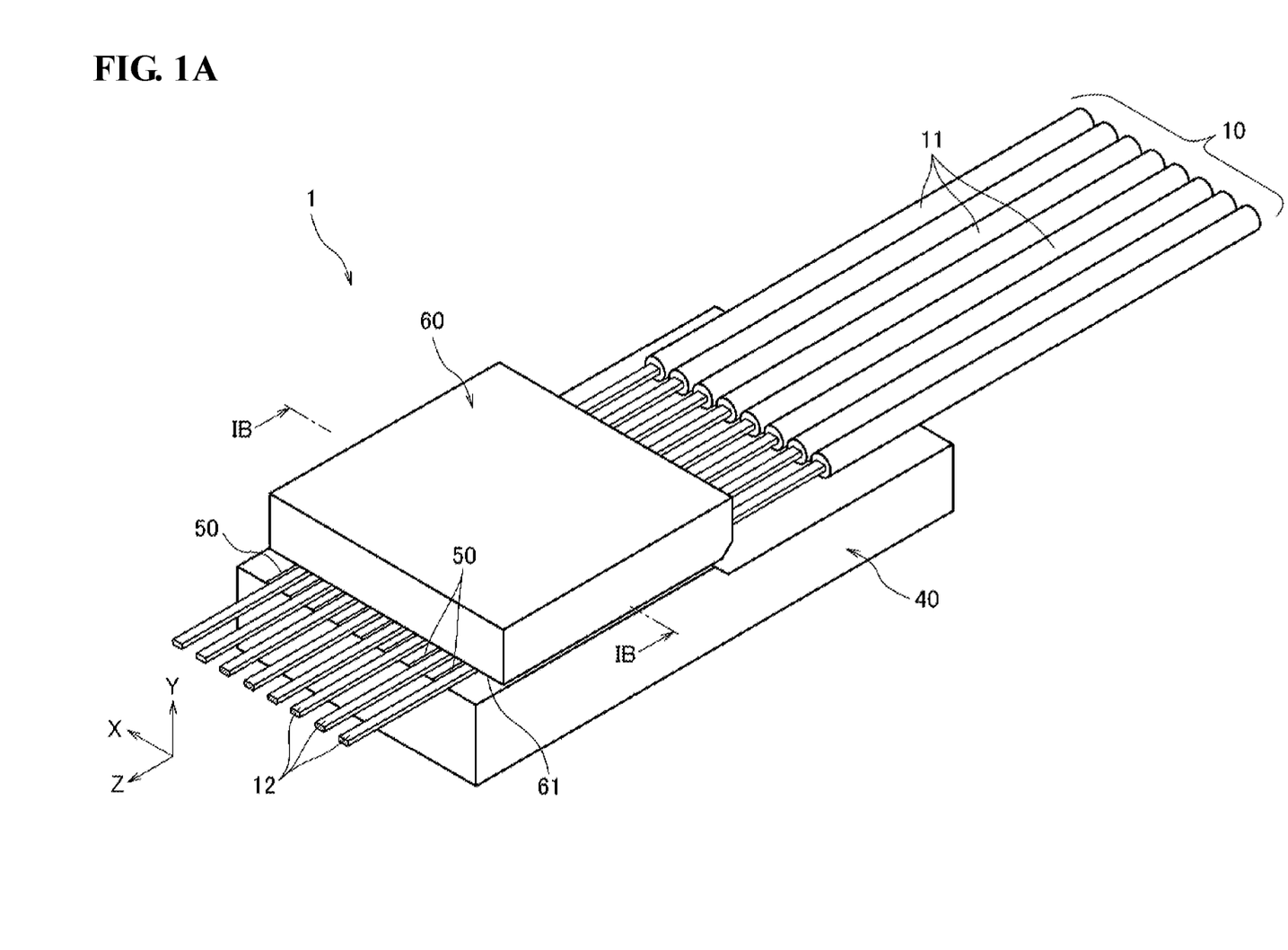
FIG. 1A is a perspective view of an optical fiber array according to one aspect of the present disclosure.

FIG. 1A is a perspective view of an optical fiber array 1 according to one aspect of the present disclosure. The optical fiber array 1 includes a groove substrate 40, a flat plate 60, and a plurality of multicore optical fibers 10. The groove substrate 40 corresponds to the arrangement component of the present disclosure, and the flat plate 60 corresponds to the pressing member of the present disclosure. The groove substrate 40 includes trapezoidal grooves 50 that open upward (in the positive direction of the Y-axis illustrated in the drawings). The trapezoidal grooves 50 correspond to the groove of the present disclosure. The trapezoidal grooves 50 extend in the Z-axis direction illustrated in the drawings and are capable of supporting barrel-shaped glass fibers 12 exposed at one end of the multicore optical fibers 10.

Figure 1B:
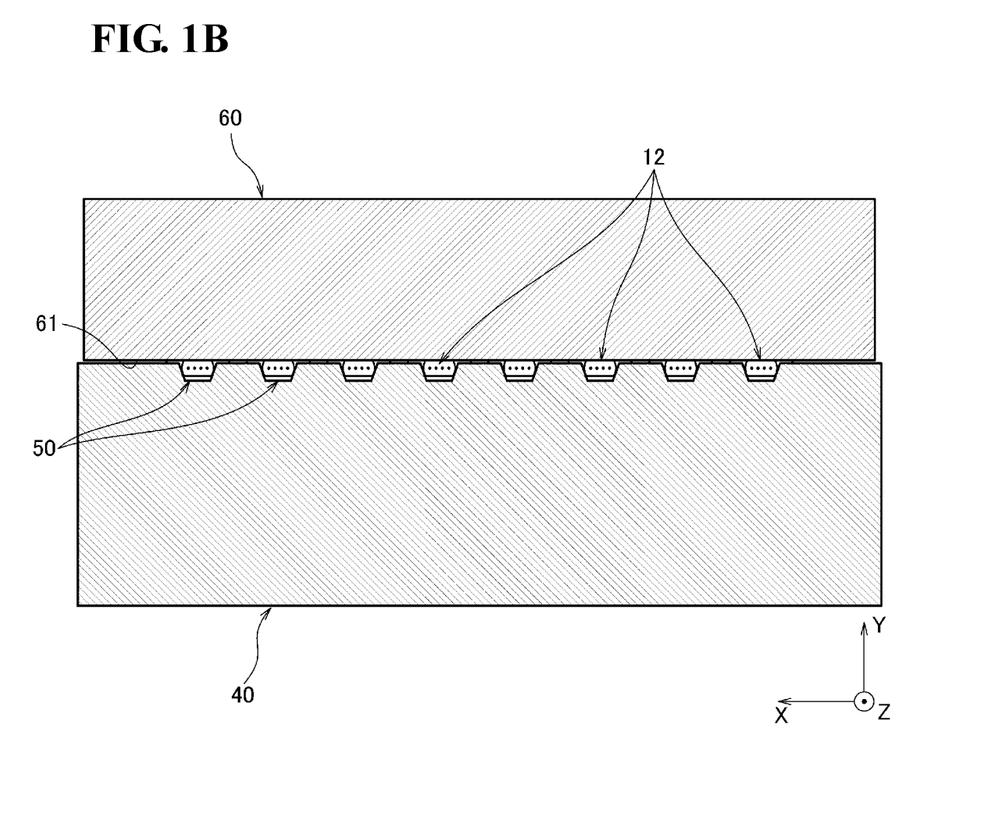
FIG. 1B is an arrow sectional view taken along the line IB-IB of FIG. 1A.
Figure 1C:
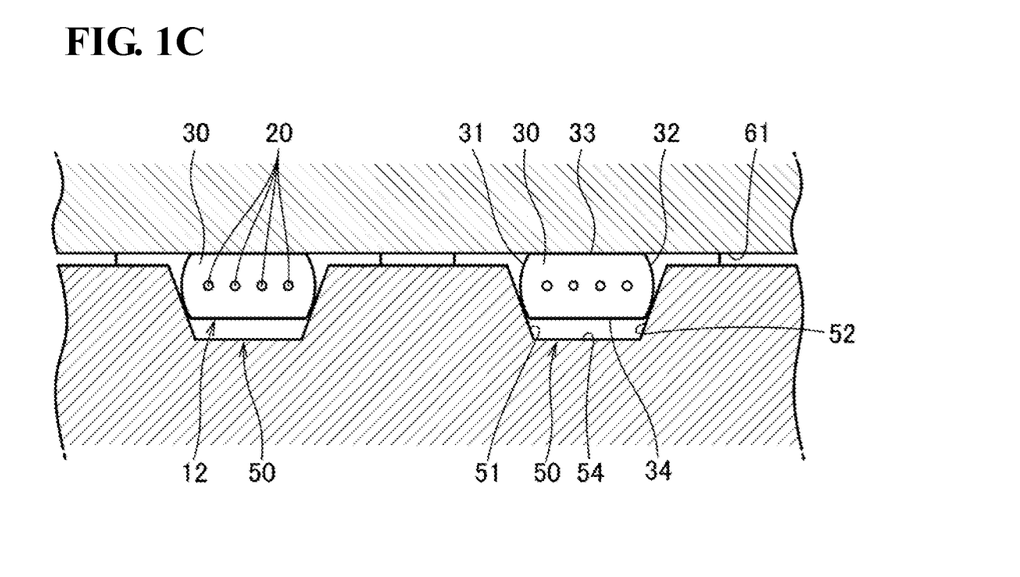
FIG. 1C is a partially enlarged view of FIG. 1B.

FIG. 1B is an arrow sectional view taken along the line IB-IB of FIG. 1A. The present embodiment includes a plurality (for example, eight) of the trapezoidal grooves 50 that are disposed side by side in the X-axis direction illustrated in the drawings. The present embodiment will be described by presenting an example that includes eight trapezoidal grooves 50 in an arrayed form; however, the present invention is also applicable when only one trapezoidal groove 50 is included. The flat plate 60 has, for example, a flat plate shape and covers the trapezoidal grooves 50 with a flat surface 61 to thereby restrict upward movement of the barrel-shaped glass fibers 12 made of silica glass and exposed from the tips of the multicore optical fibers 10. In the present embodiment, for example, eight multicore optical fibers 10 are disposed side by side in the X-axis direction illustrated in the drawings. The barrel-shaped glass fibers 12 correspond to the glass fiber of the present disclosure. FIG. 1C is a partially enlarged view of FIG. 1B. The barrel-shaped glass fibers 12 each include a plurality (for example, four) of cores 20 and cladding 30 at the peripheries of the cores 20 and extend in the Z-axis direction (corresponding to the optical axis) illustrated in the drawings.

Figure 1D:
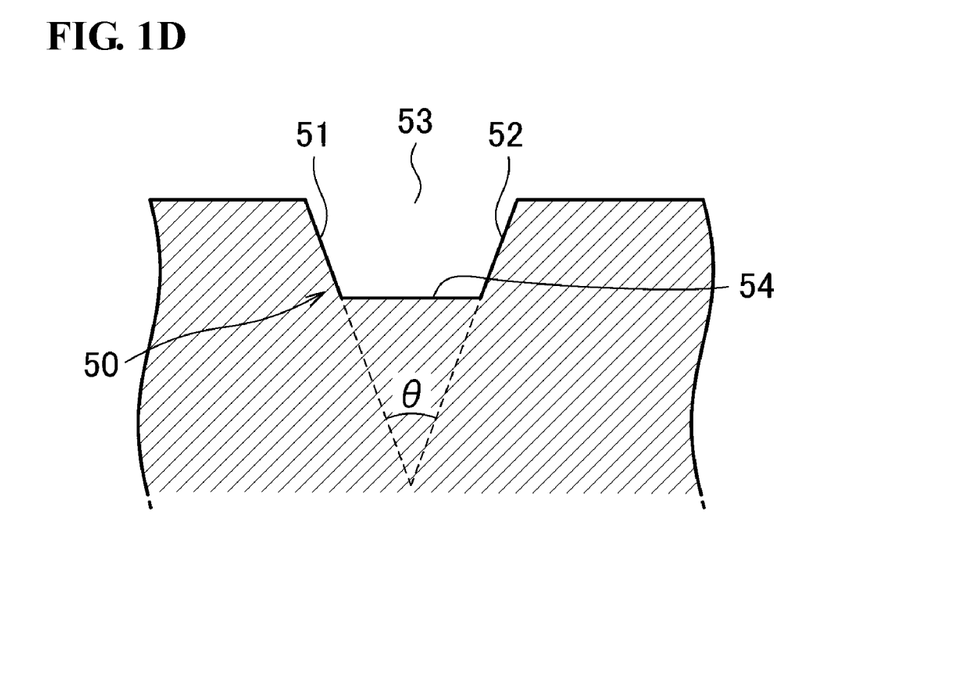
FIG. 1D is a front sectional view of a trapezoidal groove of a groove substrate included in the optical fiber array in FIG. 1A.

FIG. 1D is a front sectional view of the trapezoidal groove 50. The inner peripheral shape of the trapezoidal groove 50 is, for example, inverted isosceles trapezoid. Specifically, the trapezoidal groove 50 has a first side surface 51 and a second side surface 52 that face each other. The first side surface 51 and the second side surface 52 have tapered shapes that become closer to each other from an opening 53 toward the lower side (groove bottom). An angle formed by an extension of the first side surface 51 and an extension of the second side surface 52 is an angle θ. A bottom surface 54 is disposed at a position facing the opening 53 and is continuous with the lower end of the first side surface 51 and the lower end of the second side surface 52.

Figure 2:
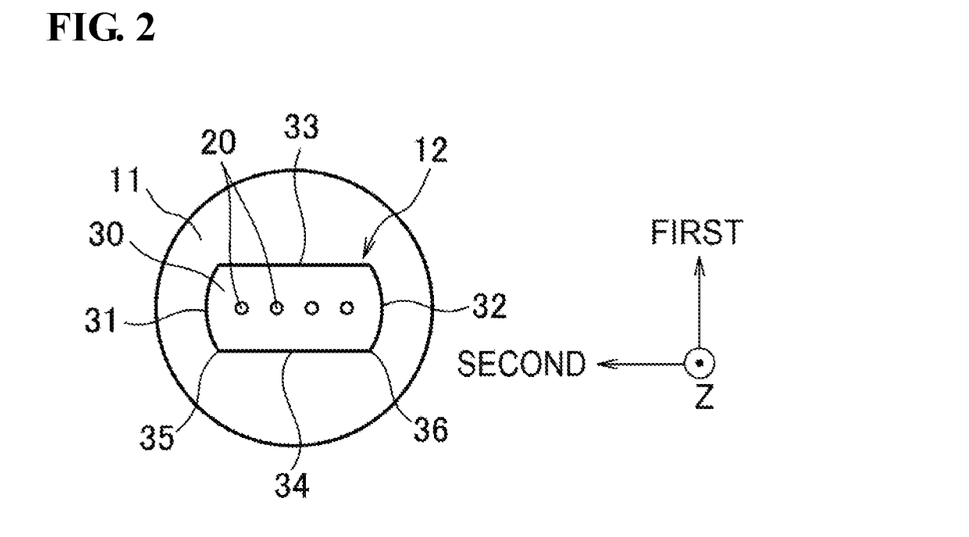
FIG. 2 is a sectional view of a barrel-shaped glass fiber perpendicular to the longitudinal direction thereof.

FIG. 2 is a sectional view of the barrel-shaped glass fiber, orthogonal to the Z-axis. The cores 20 are arrayed at equal intervals in the second axis direction illustrated in the drawings. The cladding 30 surrounds the whole circumferences of four cores 20 and has a noncircular shape (for example, a barrel shape) line symmetric with respect to both the first axis and the second axis illustrated in the drawings. The outer peripheral shape of the cladding 30 has a first convex surface 31 and a second convex surface 32 that are positioned to be line symmetric with respect to the short axis (first axis) of the cladding, and an upper surface (first surface) 33 and a lower surface (second surface) 34 that are positioned to be line symmetric with respect to the long axis (second axis) of the cladding orthogonal to the short axis of the cladding.

Specifically, the first convex surface 31 is curved to protrude so as to be spaced apart from the short axis (in other words, the center of the cladding) of the cladding 30. The second convex surface 32 is located on, for example, a circumference that differs from a circumference constituting the first convex surface 31 (note that the second convex surface 32 may be located on a circumference identical to the circumference constituting the first convex surface 31). As with the first convex surface 31, the second convex surface 32 is curved to protrude so as to be spaced apart from the short axis of the cladding 30. The upper surface 33 is parallel to the second axis and is cut to be closer than an extension of a circumference constituting the first convex surface 31 and the second convex surface 32 to the second axis (an inside toward the center of the cladding 30). The lower surface 34 is parallel, at a position opposite to the upper surface 33, to the second axis and, as with the upper surface 33, is cut to be closer than an extension of a circumference constituting the first convex surface 31 and the second convex surface 32 to the second axis.

Due to the outer peripheral shape of the cladding 30 being a shape symmetric with respect to both the first axis and the second axis, which intersect each other, it is possible to suppress the fibers from curling. The cores and the cladding include silica glass as a main component and may be added with an additive for refractive-index adjustment, as necessary. For example, it is possible for the cores to include silica glass to which $GeO_2$ is added and for the cladding to include pure silica glass. Alternatively, for example, it is possible for the cores to include pure silica glass and for the cladding to include silica glass to which an element F is added. The diameters and the refractive indexes of the cores can be not identical.

Figure 3A:
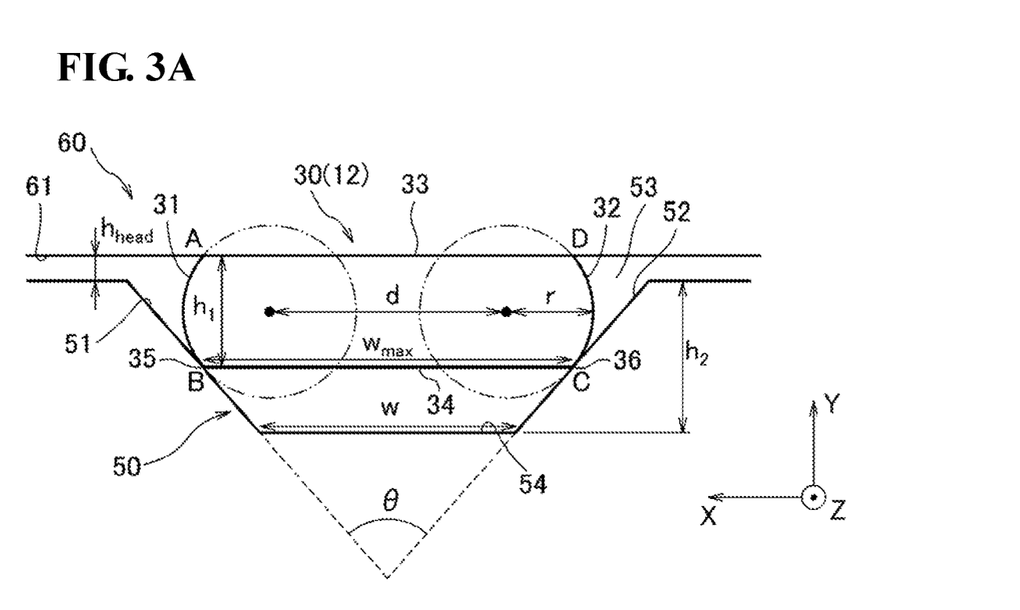
FIG. 3A describes a relationship between a barrel-shaped glass fiber and a trapezoidal groove.
Figure 3B:
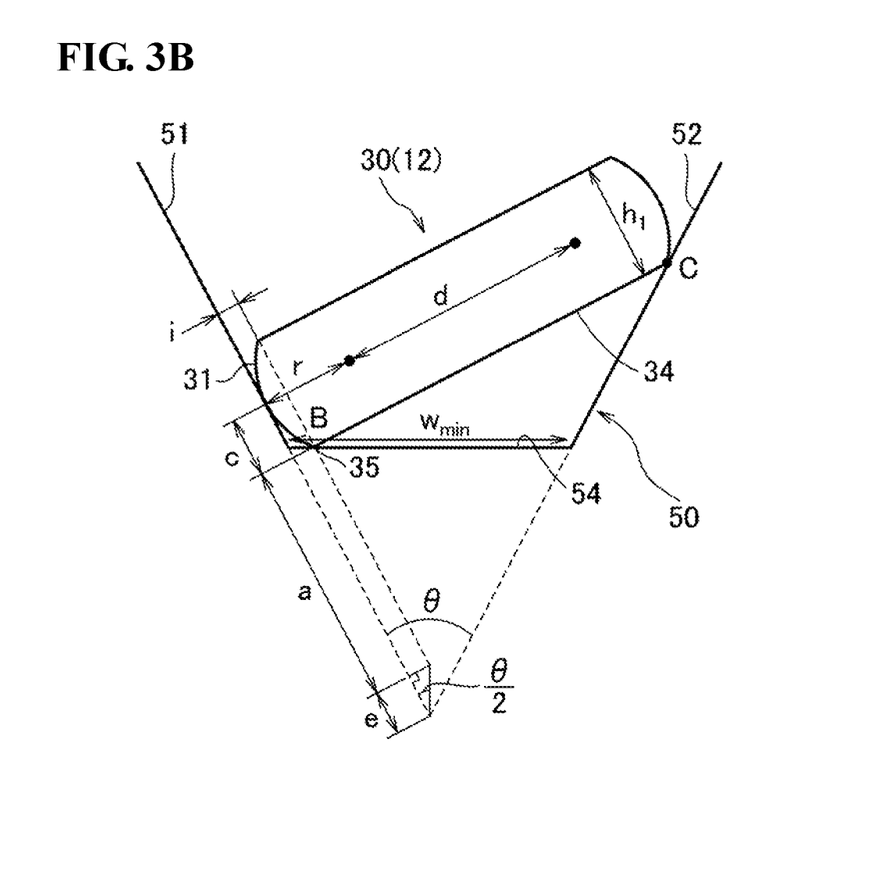
FIG. 3B describes a relationship between a barrel-shaped glass fiber and a trapezoidal groove.
Figure 3C:
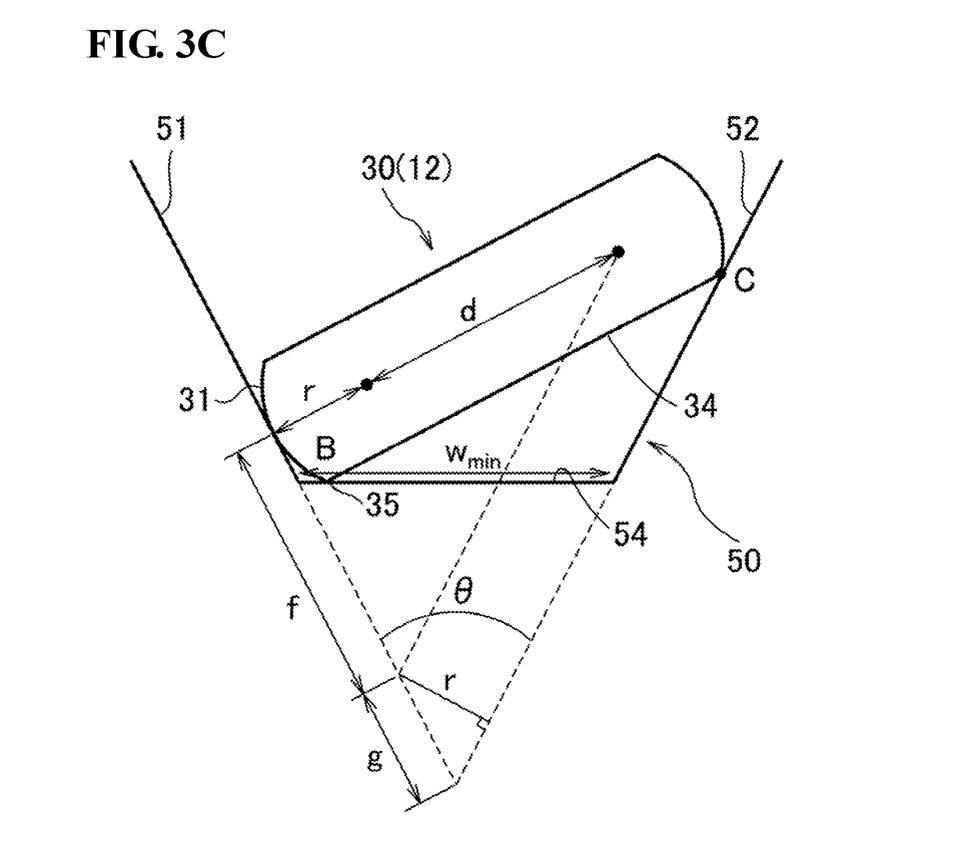
FIG. 3C describes a relationship between a barrel-shaped glass fiber and a trapezoidal groove.

FIGS. 3A, 3B, and 3C each describe a relationship between the barrel-shaped glass fiber 12 and the trapezoidal groove 50. The cladding 30 of the barrel-shaped glass fiber 12 has a sectional shape constituted by curved surfaces and flat surfaces. Therefore, a point A at a boundary portion between the upper surface 33 and the first convex surface 31, a point B at a boundary portion 35 between the first convex surface 31 and the lower surface 34, a point C at a boundary portion 36 between the lower surface 34 and the second convex surface 32, and a point D at a boundary portion between the second convex surface 32 and the upper surface 33 are edges.

When the radius of curvature of the first convex surface 31 (second convex surface 32) is represented by r and a distance between the center of the first convex surface 31 and the center of the second convex surface 32 is represented by d, a line segment BC can be expressed by the following formula 1.

$$\text{line segment } BC = d + 2\sqrt{r^2 - \frac{h_1^2}{4}} \quad (1)$$

When the maximum height of the cladding 30 is represented by $h_1$, $h_1 \leq$ line segment BC is required to be satisfied for the glass fiber 12 to rotate by being pressed by the flat plate 60, and $h_1$ is thus expressed by the following formula 2.

$$h_1 \leq d + 2\sqrt{r^2 - \frac{h_1^2}{4}} \quad (2)$$

When the formula 2 is solved for the height $h_1$, the result is the following formula 3.

$$\frac{d - \sqrt{8r^2 - d^2}}{2} \leq h_1 \leq \frac{d + \sqrt{8r^2 - d^2}}{2} \quad (3)$$

When the length (in the X-axis direction illustrated in the drawings, hereinafter the same applies) of the bottom surface 54 of the trapezoidal groove 50 is represented by W, W has an upper limit value and a lower limit value for suppressing positional displacement of the cores 20. Specifically, as illustrated in FIG. 3A, the length W of the bottom surface 54 has a maximum value $W_{max}$ (formula 4) when the lower surface 34 of the cladding 30 is disposed parallel to the bottom surface 54 and when the length W is equal to the length of the lower surface 34.

$$w_{max.} = 2\sqrt{r^2 - \frac{h_1^2}{4}} + d \quad (4)$$

In this case, a straight line extending from the center of the first convex surface 31 (second convex surface 32) to the point B (point C) is orthogonal (tangent) to the first side surface 51 (second side surface 52).

When the depth of the trapezoidal groove 50 is represented by $h_2$, $h_2$ is expressed by the following formula 5 by using $h_{head}$ representing the head protrusion amount of the cladding 30, and the maximum value $W_{max}$ of the length of the bottom surface 54.

$$h_2 = \frac{w_{max} - w}{2\tan\frac{\theta}{2}} + h_1 - h_{head} = \frac{2\sqrt{r^2 - \frac{h_1^2}{4}} + d - w}{2\tan\frac{\theta}{2}} + h_1 - h_{head} \quad (5)$$

As illustrated in FIGS. 3B and 3C, the length W of the bottom surface 54 has a minimum value $W_{min}$ when the second axis (the long axis of the cladding 30) passing through the center of the first convex surface 31 and the center of the second convex surface 32 is orthogonal to the first side surface 51 and when the boundary portion 35 (point B) between the first convex surface 31 and the lower surface 34 is in contact with the bottom surface 54. Regarding c, a, e, f, and g indicated in FIGS. 3B and 3C, the relationship of c+a+e=f+g is satisfied where c=h$_1$/2. Thus, a is expressed by the following formula 6, and e is expressed by the following formula 7.

$$a = \frac{\dfrac{w_{min}}{2\tan\dfrac{\theta}{2}} - \dfrac{i}{\sin\dfrac{\theta}{2}}}{\cos\dfrac{\theta}{2}} \quad (6)$$

$$e = \frac{i}{\tan\dfrac{\theta}{2}} \quad (7)$$

Note that $i=r-\sqrt{(r^2-c^2)}$.

Note that $f=(d+r)/\tan\theta$, and $g=r/\sin\theta$. Thus, when these are substituted in the formula 6, the result is the following formula 8.

$$w_{min.} = 2\tan\frac{\theta}{2} \times \left\{\cos\frac{\theta}{2} \times (f+g-c-e) + \frac{i}{\sin\dfrac{\theta}{2}}\right\} = 2\tan\frac{\theta}{2} \times \left[\cos\frac{\theta}{2}\left\{\frac{d+r}{\tan\theta} + \frac{r}{\sin\theta} - \frac{h_1}{2} - \frac{r-\sqrt{r^2-\dfrac{h_1^2}{4}}}{\tan\dfrac{\theta}{2}}\right\} + \frac{r-\sqrt{r^2-\dfrac{h_1^2}{4}}}{\sin\dfrac{\theta}{2}}\right] \quad (8)$$

Figure 4A:
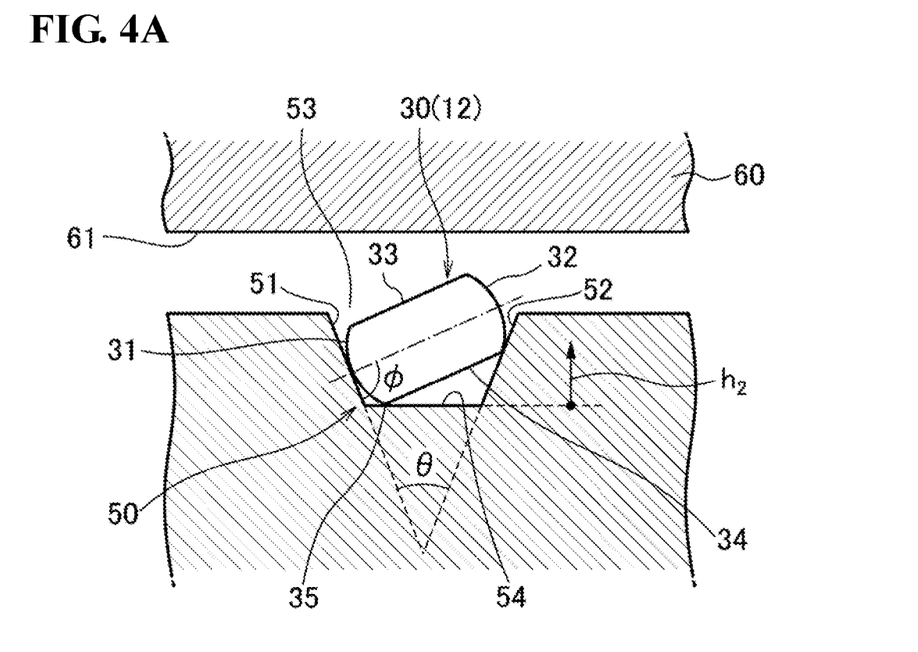
FIG. 4A illustrates a state of a barrel-shaped glass fiber disposed in a trapezoidal groove of a sample 1, the state being before rotational alignment.
Figure 4B:
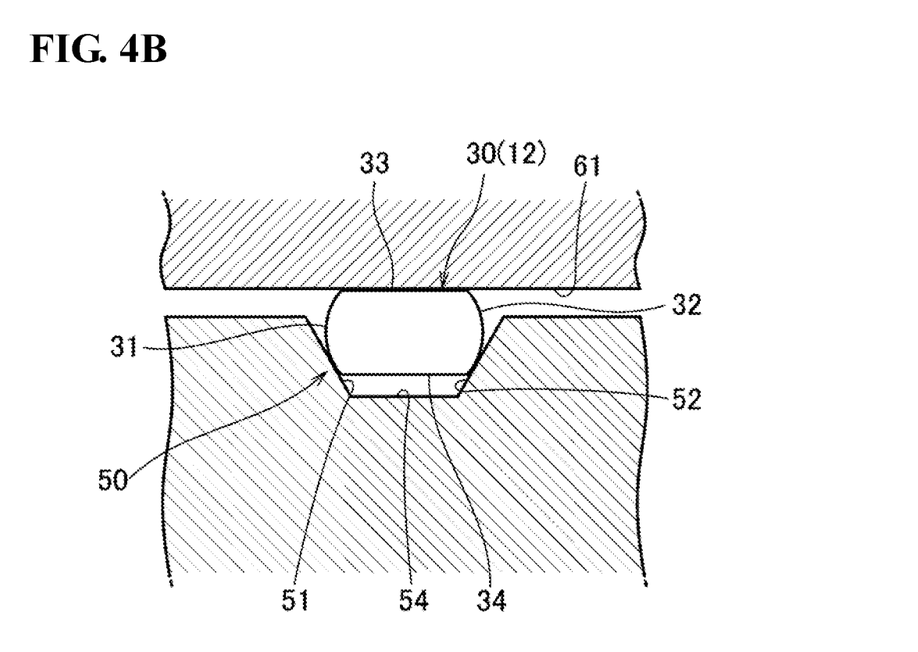
FIG. 4B illustrates a state of the barrel-shaped glass fiber disposed in the trapezoidal groove of the sample 1, the state being after rotational alignment.

FIGS. 4A and 4B are conceptual diagrams describing a first specific example of the optical fiber array of the present disclosure. FIG. 4A illustrates a state before a barrel-shaped glass fiber is subjected to rotational alignment. The shape of the trapezoidal groove 50 is a shape with which, before the barrel-shaped glass fiber 12 is pressed downward by the flat plate 60, a region of the cladding 30 from the first convex surface 31 to the second convex surface 32 via the lower surface 34 comes into contact with total three portions of the first side surface 51, the bottom surface 54, and the second side surface 52 of the trapezoidal groove 50.

More specifically, the trapezoidal groove 50 (referred to as a sample 1) illustrated in FIG. 4A has a shape with which the first convex surface 31 of the cladding 30 comes into line (line extending in an optical axis direction, hereinafter the same applies) contact with the first side surface 51, the boundary portion 35 between the first convex surface 31 and the lower surface 34 comes into line contact with the bottom surface 54, and the second convex surface 32 comes into line contact with the second side surface 52. In order to reliably suppress the barrel-shaped glass fiber 12 from sinking, the trapezoidal groove 50 of the sample 1 can have a shape with which, an angle φ formed by the second axis (indicated by a one-dot chain line in the drawings) passing through the center of the cladding 30 and the first side surface 51 is equal to or less than π/2. In this case, the depth h$_2$ of the trapezoidal groove 50 is a depth with which φ is equal to or less than π/2.

FIG. 4B illustrates a state after a barrel-shaped glass fiber is subjected to rotational alignment. After the barrel-shaped glass fiber 12 is disposed in the trapezoidal groove 50 of the sample 1, when the flat plate 60 is lowered toward the barrel-shaped glass fiber 12, the flat surface 61 comes into contact with a portion of the cladding 30, the portion being, for example, in the vicinity of the boundary between the upper surface 33 and the second convex surface 32. When the flat plate 60 further presses the barrel-shaped glass fiber 12 downward, the boundary portion 35 between the first convex surface 31 and the lower surface 34 separates from the bottom surface 54, the barrel-shaped glass fiber 12 rotates clockwise, the upper surface 33 comes into surface contact with the flat surface 61, and the lower surface 34 becomes parallel to the bottom surface 54. At this time, a line at which the first convex surface 31 and the first side surface 51 are in contact with each other and a line at which the second convex surface 32 and the second side surface 52 are in contact with each other are substantially equal to each other in terms of height from the bottom surface 54.

Thus, the trapezoidal groove 50 has a trapezoidal shape with which the upper surface 33 and the lower surface 34 of the cladding 30 are disposed parallel to the flat surface 61 after the barrel-shaped glass fiber 12 is pressed downward. Therefore, when the barrel-shaped glass fiber 12 is disposed in the trapezoidal groove 50, the barrel-shaped glass fiber 12 does not sink downward, compared with an existing glass fiber. Regarding the barrel-shaped glass fiber 12 disposed in the trapezoidal groove 50 of the sample 1, the arrayed position of the cores 20 after being pressed by the flat plate 60 was evaluated, and a displacement amount from an ideal position (maximum core-positional misalignment amount) was within ±1.0 (μm).

Figure 5A:
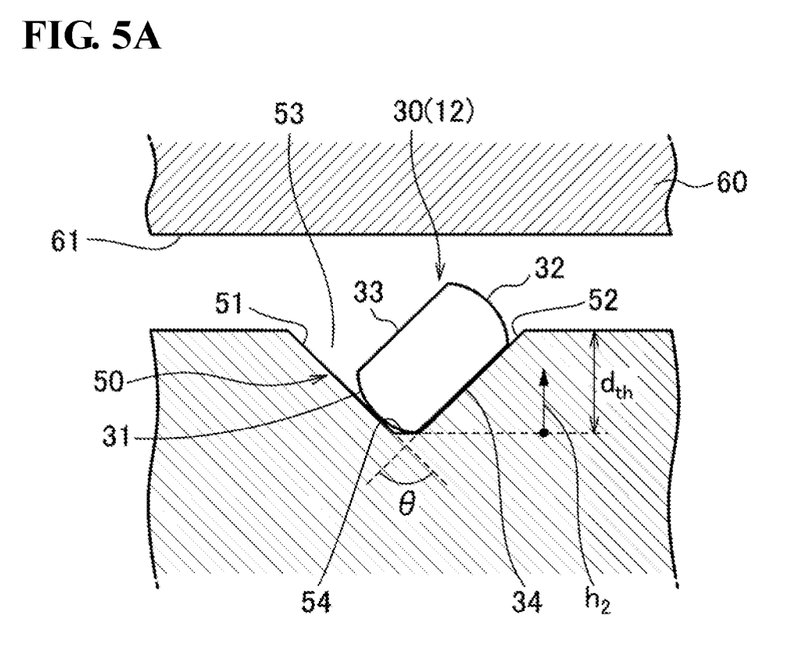
FIG. 5A illustrates a state of a barrel-shaped glass fiber disposed in a trapezoidal groove of a sample 2, the state being before rotational alignment.
Figure 5B:
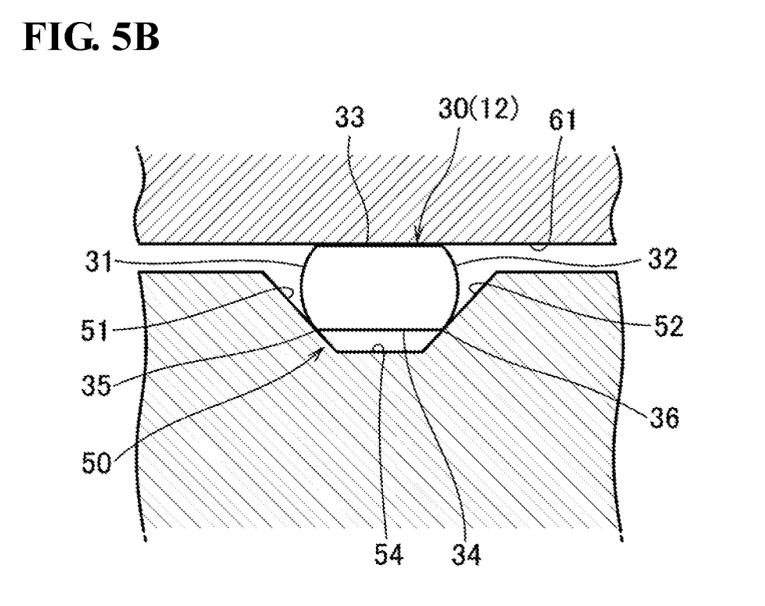
FIG. 5B illustrates a state of the barrel-shaped glass fiber disposed in the trapezoidal groove of the sample 2, the state being after rotational alignment.

FIGS. 5A and 5B are conceptual diagrams describing a second specific example of the optical fiber array of the present disclosure. FIG. 5A illustrates a state before a barrel-shaped glass fiber is subjected to rotational alignment. In the second specific example, the shape of the trapezoidal groove 50 (referred to as a sample 2) is a shape with which, before the barrel-shaped glass fiber 12 is pressed downward by the flat plate 60, the first convex surface 31 of the cladding 30 comes into line contact with each of the first side surface 51 and the bottom surface 54, and the lower surface 34 comes into surface contact with the second side surface 52. In order to reliably suppress the barrel-shaped glass fiber 12 from sinking, the trapezoidal groove 50 of the sample 2 can have a shape with which, an angle θ formed by an extension of the first side surface 51 and an extension of the second side surface 52 is π/2 or more. When a groove depth is represented by d$_{th}$, the depth h$_2$ of the trapezoidal groove 50 is a depth smaller than d$_{th}$. Although the trapezoidal groove 50 (sample 1) has a shape that is also established even when the angle θ formed by the first side surface 51 and the second side surface 52 is π/2 or less, θ may be π/2 or more even in the case of the sample 1.

FIG. 5B illustrates a state after a barrel-shaped glass fiber is subjected to rotational alignment. After the barrel-shaped glass fiber 12 is disposed in the trapezoidal groove 50 of the sample 2, when the flat plate 60 is lowered toward the barrel-shaped glass fiber 12, the flat surface 61 comes into contact with a portion of the cladding 30, the portion being, for example, in the vicinity of the boundary between the upper surface 33 and the second convex surface 32. When the flat plate 60 further presses the barrel-shaped glass fiber 12 downward, the first convex surface 31 separates from the bottom surface 54, the surface-contact between the lower surface 34 and the second side surface 52 is released, the barrel-shaped glass fiber 12 rotates clockwise, the upper surface 33 comes into surface contact with the flat surface 61, and the lower surface 34 becomes parallel to the bottom surface 54. At this time, a line at which the boundary portion 35 between the first convex surface 31 and the lower surface 34 and the first side surface 51 are in contact with each other and a line at which the boundary portion 36 between the lower surface 34 and the second convex surface 32 and the second side surface 52 are in contact with each other are equal to each other in terms of height from the bottom surface 54. Regarding the barrel-shaped glass fiber 12 disposed in the trapezoidal groove 50 of the sample 2, the arrayed position of the cores 20 after being pressed by the flat plate 60 was evaluated, and the maximum core-positional misalignment amount was within ±1.0 (μm).

FIGS. 6A, 6B, 6C, and 6D each illustrate a state before a barrel-shaped glass fiber is subjected to rotational alignment. In the trapezoidal groove 50 (referred to as a sample 3) illustrated in FIG. 6A, the length W of the bottom surface 54 is longer than the length of the lower surface 34 of the cladding 30. Consequently, the lower surface 34 is in surface contact with the bottom surface 54, and the first convex surface 31 (second convex surface 32) is not in contact with the first side surface 51 (second side surface 52). When the flat plate 60 is lowered toward the barrel-shaped glass fiber 12, the flat surface 61 comes into surface contact with the upper surface 33, and, however, the barrel-shaped glass fiber 12 is moved in a left-right direction. The arrayed position of the cores 20 was evaluated, and the maximum core-positional misalignment amount was not within ±1.0 (μm).

Figure 6A:
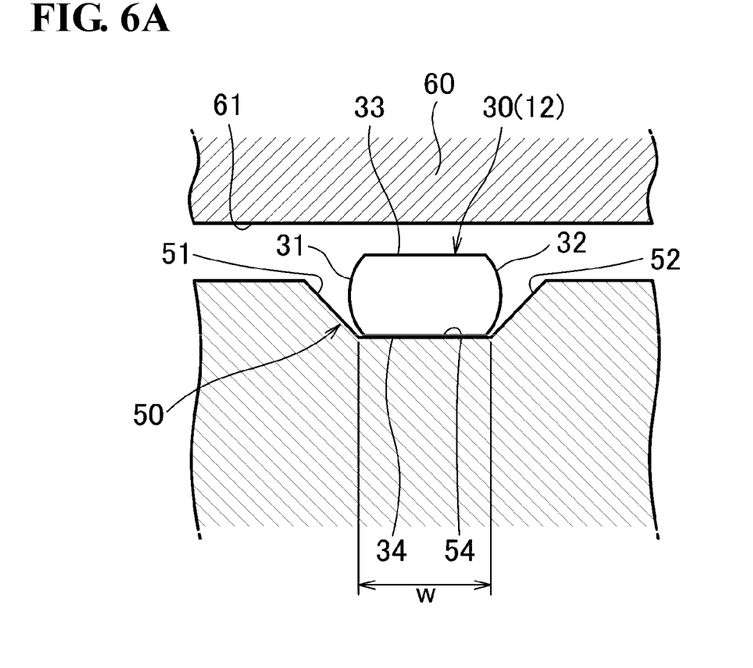
FIG. 6A illustrates a state of a barrel-shaped glass fiber disposed in a trapezoidal groove of a sample 3, the state being before rotational alignment.
Figure 6B:
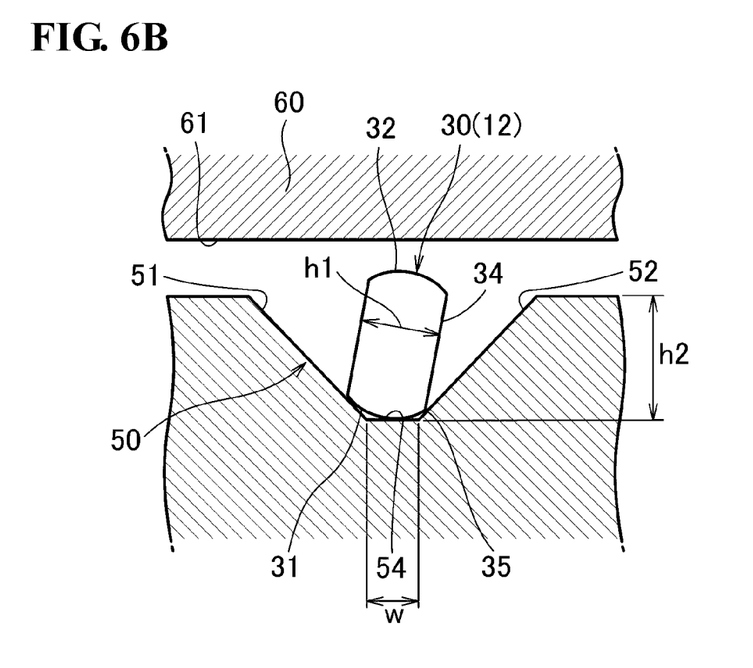
FIG. 6B illustrates a state of a barrel-shaped glass fiber disposed in a trapezoidal groove of a sample 4, the state being before rotational alignment.

In the trapezoidal groove 50 (referred to as a sample 4) illustrated in FIG. 6B, the barrel-shaped glass fiber 12 has sunk to the lower portion since the depth $h_2$ of the trapezoidal groove 50 is large. The length W of the bottom surface 54 is shorter than the maximum height $h_1$ of the cladding 30. Consequently, the first convex surface 31 is in line contact with each of the first side surface 51 and the bottom surface 54, and the boundary portion 35 between the first convex surface 31 and the lower surface 34 is in line contact with the second side surface 52. When the flat plate 60 is lowered toward the barrel-shaped glass fiber 12, the flat surface 61 comes into contact with the second convex surface 32, and the first convex surface 31 is pressed against the bottom surface 54. The barrel-shaped glass fiber 12 is thus not able to rotate.

Figure 6C:
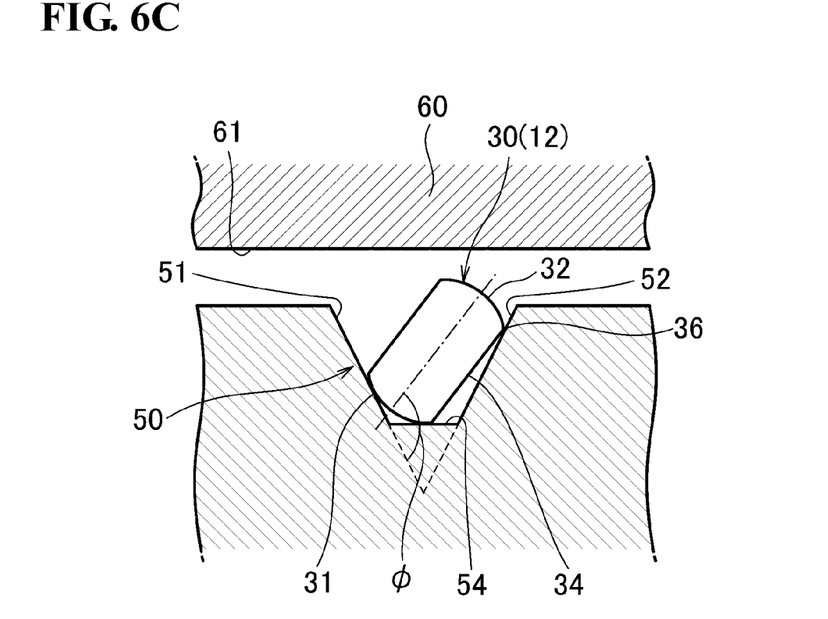
FIG. 6C illustrates a state of a barrel-shaped glass fiber disposed in a trapezoidal groove of a sample 5, the state being before rotational alignment.

In the trapezoidal groove 50 (referred to as a sample 5) illustrated in FIG. 6C, the angle φ formed by the second axis (indicated by a one-dot chain line in the drawings) passing through the center of the cladding 30 and the first side surface 51 is more than π/2, and the barrel-shaped glass fiber 12 has sunk to a lower portion. Therefore, the first convex surface 31 is in line contact with each of the first side surface 51 and the bottom surface 54, and the boundary portion 36 between the lower surface 34 and the second convex surface 32 is in line contact with the second side surface 52. When the flat plate 60 is lowered toward the barrel-shaped glass fiber 12, the flat surface 61 comes into contact with the second convex surface 32, and the first convex surface 31 is pressed against the first side surface 51 and the bottom surface 54. The barrel-shaped glass fiber 12 is thus not able to rotate.

Figure 6D:
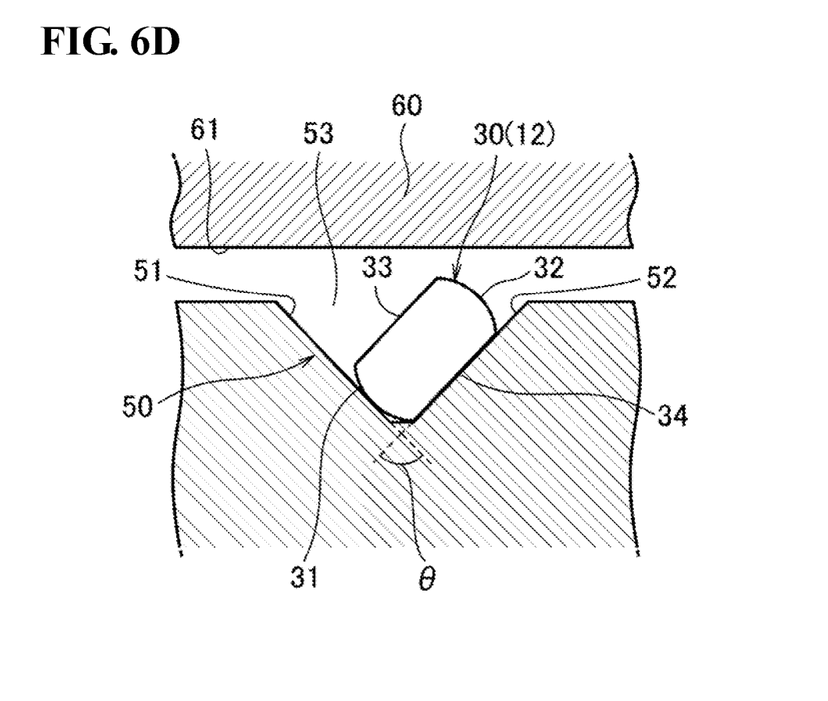
FIG. 6D illustrates a state of a barrel-shaped glass fiber disposed in a trapezoidal groove of a sample 6, the state being before rotational alignment.

In the trapezoidal groove 50 (referred to as a sample 6) illustrated in FIG. 6D, the angle θ formed by an extension of the first side surface 51 and an extension of the second side surface 52 is less than π/2, and the barrel-shaped glass fiber 12 has sunk to a lower portion. Consequently, the first convex surface 31 is in line contact with the first side surface 51, and the lower surface 34 is in surface contact with the second side surface 52. When the flat plate 60 is lowered toward the barrel-shaped glass fiber 12, the flat surface 61 comes into contact with a portion in the vicinity of the boundary between the upper surface 33 and the second convex surface 32. The barrel-shaped glass fiber 12 is, however, not able to rotate due to the first convex surface 31 being pressed against the first side surface 51 and the lower surface 34 being pressed against the second side surface 52.

The embodiments disclosed above are presented as examples in all aspects and should be considered as non-limiting examples. The scope of the present invention is indicated by the claims, not by the aforementioned significance, and is intended to include significance equivalent to the claims and all changes within the scope.

What is claimed is:

1. An optical fiber array comprising:
at least one multicore optical fiber each including a glass fiber and a resin coat covering the glass fiber, the glass fiber including a plurality of cores and cladding surrounding the plurality of cores, the cladding having an outer peripheral shape having a first convex surface, a second convex surface, a first surface, and a second surface, the first convex surface and the second convex surface having shapes that are symmetric with respect to a first axis and that protrude to be spaced apart from the first axis in a cross section orthogonal to a longitudinal direction of each multicore optical fiber, the first surface and the second surface having shapes that are symmetric with respect to a second axis orthogonal to the first axis and that are cut to be closer than an extension of the first convex surface and an extension of the second convex surface to the second axis in the cross section orthogonal to the longitudinal direction of each multicore optical fiber;
an arrangement component on which the glass fiber is disposed, the arrangement component including a groove that houses the glass fiber exposed at one end of each multicore optical fiber from the resin coat, an inner peripheral shape of the groove in a cross section orthogonal to a longitudinal direction of the groove being a trapezoidal shape having a first side surface, a second side surface, and a bottom surface, the first side surface and the second side surface facing each other so as to become closer to each other from an opening toward a groove bottom, the bottom surface facing the opening and being continuous with the first side surface and the second side surface; and
a pressing member that presses the glass fiber toward the arrangement component and fixes the glass fiber in the groove,
wherein, in a state in which the first surface of the cladding is in surface contact with the pressing member, the first convex surface of the cladding is in contact with the first side surface and the second convex surface is in contact with the second side surface, or a boundary portion between the first convex surface and the second surface is in contact with the first side surface and a boundary portion between the second surface and the second convex surface is in contact with the second side surface.

2. The optical fiber array according to claim 1,
wherein the trapezoidal shape is a shape that enables the first convex surface of the cladding to come into contact with the first side surface of the groove, the boundary portion between the first convex surface and the second surface to come into contact with the bottom surface, and the second convex surface to come into contact with the second side surface.

3. The optical fiber array according to claim 2,
wherein an angle φ formed by the second axis passing through a center of the cladding and the first side surface or the second side surface is π/2 or less.

4. The optical fiber array according claim 1,
wherein the trapezoidal shape is a shape that enables the first convex surface of the cladding to come into contact with each of the first side surface and the bottom surface of the groove, and the second surface to come into contact with the second side surface.

5. The optical fiber array according to claim 2,
wherein, an angle $\theta$ formed by an extension of the first side surface and an extension of the second side surface with respect to the opening is $\pi/2$ or more.

6. The optical fiber array according to claim 4
wherein, an angle $\theta$ formed by an extension of the first side surface and an extension of the second side surface with respect to the opening is $\pi/2$ or more.

7. The optical fiber array according to claim 1,
wherein the at least one multicore optical fiber comprises multicore optical fibers including glass fibers respectively and the glass fibers are disposed side by side on the arrangement component.

\* \* \* \* \*